(12) United States Patent
Yang (10) Patent No.: US 12,457,413 B2
(45) Date of Patent: Oct. 28, 2025

(54) IMAGE GENERATION METHOD AND APPARATUS, AND ELECTRONIC DEVICE

(71) Applicant: VIVO MOBILE COMMUNICATION CO., LTD., Guangdong (CN)

(72) Inventor: Zhengsi Yang, Zhejiang (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 241 days.

(21) Appl. No.: 18/334,146

(22) Filed: Jun. 13, 2023

(65) Prior Publication Data
US 2023/0345112 A1 Oct. 26, 2023

Related U.S. Application Data

(63) Continuation of application No. PCT/CN2021/140477, filed on Dec. 22, 2021.

(30) Foreign Application Priority Data

Dec. 25, 2020 (CN) .......................... 202011568035.7

(51) Int. Cl.
*H04N 23/63* (2023.01)
*H04N 5/262* (2006.01)
*H04N 23/69* (2023.01)

(52) U.S. Cl.
CPC ......... *H04N 23/632* (2023.01); *H04N 5/2624* (2013.01); *H04N 23/69* (2023.01)

(58) Field of Classification Search
CPC .... H04N 23/632; H04N 5/2624; H04N 23/69; H04N 23/631; H04N 23/635; H04N 23/62
See application file for complete search history.

(56) References Cited

U.S. PATENT DOCUMENTS

2003/0193562 A1* 10/2003 Corzillus ............... H04N 7/185
    348/E7.086
2015/0296145 A1* 10/2015 Hwang ................. H04N 23/90
    348/262

(Continued)

FOREIGN PATENT DOCUMENTS

| CN | 106412431 A | 2/2017 |
|---|---|---|
| CN | 106713772 A | 5/2017 |

(Continued)

OTHER PUBLICATIONS

Extended European Search Report for Application No. 21909470.3, dated Mar. 19, 2024, 9 Pages.

(Continued)

*Primary Examiner* — Timothy J Henn
(74) *Attorney, Agent, or Firm* — BROOKS KUSHMAN P.C.

(57) ABSTRACT

An image generation method and apparatus, and an electronic device. The method includes: in a case that a first image is displayed in a first region of a photographing preview interface and the first image includes a target object, displaying, in a second region in the first region, a second image including the target object, where a display size of the target object in the second image is greater than a display size of the target object in the first image; receiving a first input; and capturing a third image and a fourth image in response to the first input, and generating a target image based on the third image and the fourth image according to a target layout mode, where the target layout mode is a layout mode of the first image and the second image.

20 Claims, 4 Drawing Sheets

---

Step 101: In a case that a first image is displayed in a first region of a photographing preview interface and the first image includes a target object, an electronic device displays, in a second region in the first region, a second image including the target object Step 102: The electronic device receives a first input Step 103: The electronic device captures a third image and a fourth image in response to the first input, and generates a target image based on the third image and the fourth image according to a target layout mode (56) References Cited

U.S. PATENT DOCUMENTS

| | | | |
|---|---|---|---|
| 2017/0034449 A1* | 2/2017 | Eum | H04N 23/62 |
| 2018/0013957 A1* | 1/2018 | Irie | H04N 23/62 |
| 2018/0196472 A1* | 7/2018 | Lee | H04N 5/772 |
| 2019/0364195 A1* | 11/2019 | Kim | H04N 23/45 |
| 2020/0257436 A1 | 8/2020 | Yun et al. | |
| 2022/0159183 A1* | 5/2022 | Li | H04N 23/635 |
| 2022/0394190 A1 | 12/2022 | Cui et al. | |

FOREIGN PATENT DOCUMENTS

| | | | |
|---|---|---|---|
| CN | 107277371 A | | 10/2017 |
| CN | 107592461 A | * | 1/2018 |
| CN | 108781254 A | | 11/2018 |
| CN | 109087174 A | | 12/2018 |
| CN | 110365907 A | | 10/2019 |
| CN | 110896451 A | | 3/2020 |
| CN | 111010506 A | | 4/2020 |
| CN | 111541845 A | | 8/2020 |
| CN | 112702524 A | | 4/2021 |
| EP | 4044580 A1 | | 8/2022 |
| JP | 2005215775 A | | 8/2005 |
| JP | 2018142340 A | | 9/2018 |
| WO | 2018166069 A1 | | 9/2018 |
| WO | 2019027090 A1 | | 2/2019 |

OTHER PUBLICATIONS

First Office Action for Japanese Application No. 2023-534720, dated Feb. 29, 2024, 3 Pages.
First Office Action for Chinese Application No. 202011568035.7, dated Dec. 16, 2021, 9 Pages.
International Search Report and Written Opinion for Application No. PCT /CN2021/140477, dated Feb. 17, 2022, 7 Pages.

* cited by examiner

IMAGE GENERATION METHOD AND APPARATUS, AND ELECTRONIC DEVICE

CROSS-REFERENCE TO RELATED APPLICATIONS

This application is a continuation application of PCT International Application No. PCT/CN2021/140477 filed on Dec. 12, 2021, which claims priority to Chinese Patent Application No. 202011568035.7, filed in China on Dec. 25, 2020, which are incorporated in their entireties by reference herein.

TECHNICAL FIELD

Embodiments of this application relate to the field of communications technologies, and in particular, to an image generation method and apparatus, and an electronic device.

BACKGROUND

With development of electronic technologies, a user can capture images by using an electronic device. However, when viewing the captured images, the user may ignore some important information in the images.

For example, a user captures a supermarket poster by using an electronic device, where the poster includes "Buy one and get one free" displayed in large font and "The seller reserves the right of interpretation" displayed in small font. In a case that "The seller reserves the right of interpretation" appears at an unobvious position in small font, the user is likely to ignore this important information when viewing the poster image. Therefore, when viewing a captured image, a user may ignore some important information in the image due to a layout of the image, a display size of information in the image, and other factors.

SUMMARY

This application is implemented as follows:

According to a first aspect, an embodiment of this application provides an image generation method. The method includes: in a case that a first image is displayed in a first region of a photographing preview interface and the first image includes a target object, displaying, in a second region in the first region, a second image including the target object, where a display size of the target object in the second image is greater than a display size of the target object in the first image; receiving a first input; and capturing a third image and a fourth image in response to the first input, and generating a target image based on the third image and the fourth image according to a target layout mode, where the target layout mode is a layout mode of the first image and the second image.

According to a second aspect, an embodiment of this application provides an image generation apparatus. The apparatus includes a display module, a receiving module, a processing module and a capture module, where the display module is configured to: in a case that a first image is displayed in a first region of a photographing preview interface and the first image includes a target object, display, in a second region in the first region, a second image including the target object, where a display size of the target object in the second image is greater than a display size of the target object in the first image; the receiving module is configured to receive a first input; and the processing module is configured to: in response to the first input received by the receiving module, control the capture module to capture a third image and a fourth image, and generate a target image based on the third image and the fourth image according to a target layout mode, where the target layout mode is a layout mode of the first image and the second image.

According to a third aspect, an embodiment of this application provides an electronic device, where the electronic device includes a processor, a memory, and a program or instructions stored in the memory and executable on the processor, and when the program or instructions are executed by the processor, the steps of the method according to the first aspect are implemented.

According to a fourth aspect, an embodiment of this application provides a readable storage medium, where the readable storage medium stores a program or instructions, and when the program or instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances, so that the embodiments of this application can be implemented in other orders than the order illustrated or described herein. In addition, the objects distinguished by "first", "second", and the like usually belong to one category, and the number of objects is not limited. For example, there may be one or more first objects. In addition, in the specification and claims, "and/or" represents at least one of connected objects, and the character "/" typically represents an "or" relationship between the associated objects.

The following describes in detail an image generation method provided in the embodiments of this application with reference to the accompanying drawings and by using specific embodiments and application scenarios thereof.

A method provided in the embodiments of this application may be applied to a scenario of obtaining an original image including a locally enlarged image. In a case that a first image is displayed in a first region of a photographing preview interface and the first image includes a target object, a second image including the target object is displayed in a second region in the first region, where a display size of the target object in the second image is greater than a display size of the target object in the first image. Then an electronic device receives a first input, captures a third image and a fourth image in response to the input, and generates a target image based on the third image and the fourth image according to a layout mode of the first image and the second image. According to the method, the electronic device may display, on the preview interface, an original image (for example, the first image) and a locally enlarged image (for example, the second image) that include important information, and may receive an input by a user for triggering the electronic device to capture the third image and the fourth image, and synthesize the third image and the fourth image into a target image according to a layout mode of the original image and the locally enlarged image. In this way, the electronic device can generate an original image (namely, the target image) including a locally enlarged image. This can prevent some important information in the original image from being ignored and perform a reminder function, so as to facilitate operations by the user and improve user experience.

Figure 1:
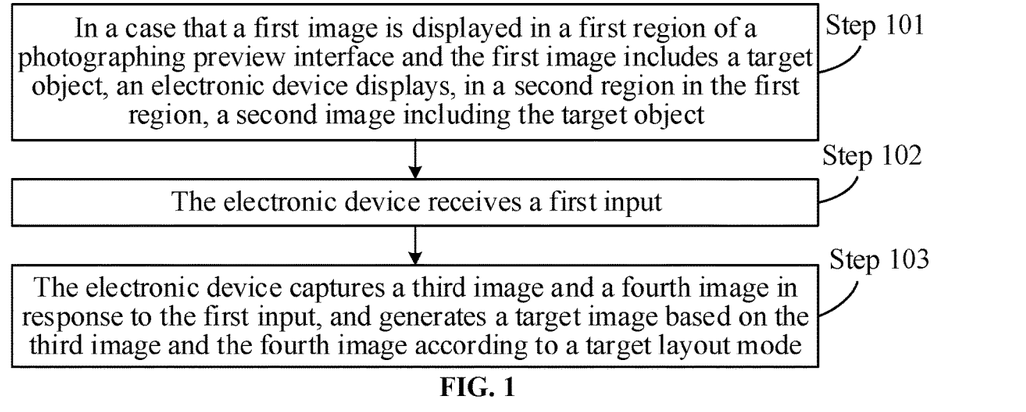
FIG. 1 is a first schematic diagram of an image generation method according to an embodiment of this application.

As shown in FIG. 1, an embodiment of this application provides an image generation method. The method may include the following step 101 to step 103.

Step 101: In a case that a first image is displayed in a first region of a photographing preview interface and the first image includes a target object, an electronic device displays, in a second region in the first region, a second image including the target object.

A display size of the target object in the second image is greater than a display size of the target object in the first image.

It should be noted that, in this embodiment of this application, the photographing preview interface of the electronic device includes the first region and the second region, and the second region is included in the first region. For example, in a case that the first region is the entire photographing preview interface, the second region is a region in the first region, that is, a local region on the photographing preview interface. Sizes, shapes, and a position relationship of the first region and the second region may be determined according to an actual application requirement.

Optionally, in this embodiment of this application, the first image and the second image may be images captured by the same camera, or may be images captured by different cameras. Specifically, in a case that the electronic device uses one camera, the second image may be a locally enlarged image of the first image, that is, a region that is in the first image and that includes the target object is locally enlarged, so that the display size of the target object in the second image is greater than the display size of the target object in the first image. In a case that the electronic device uses two cameras to respectively capture the first image and the second image, a zoom ratio of a camera capturing the second image is higher than that of a camera capturing the first image (for details, refer to detailed descriptions in the following step 103a1), so that the display size of the target object in the second image is greater than the display size of the target object in the first image. This may be specifically determined according to an operation requirement of a user, and is not specifically limited in this embodiment of this application.

It should be noted that, for ease of description of the following embodiments of this application, a manner of using two cameras to capture images is used as an example for description, that is, a first camera captures an image of the target object to obtain the first image, and a second camera captures an image of the target object to obtain the second image. The following embodiments in which two cameras are used to obtain the first image and the second image may be implemented by using one camera. This is not construed as a specific limitation on this application.

Optionally, in this embodiment of this application, the target object is an object to be photographed by the user. The target object includes content of the user's interest (for example, important information of the user's interest), and a size of the target object is smaller than that of an entire captured image. Specifically, the target object may be a text in a poster in an elevator, content of a propaganda poster of a supermarket, a text in an advertisement banner, or the like. The target object may be a part or all of an entire image captured by the electronic device, and the target object may appear in images captured by different cameras (for example, in a case in the following step 103a1).

For example, the user captures a propaganda poster of a supermarket by using the electronic device, where the poster includes "Buy one and get one free" displayed in large font and "The seller reserves the right of interpretation" (namely, the target object) displayed in small font. In this case, the first image may be an entire poster that is captured by the first camera and that includes "Buy one and get one free" displayed in large font and "The seller reserves the right of interpretation" (namely, the target object) displayed in small font, and the second image may be an image, captured by the second camera, of a region in which "The seller reserves the right of interpretation" is displayed in small font (that is, the second image also includes the target object).

Optionally, in this embodiment of this application, the target object is at least one of the following: a character smaller than or equal to a preset font size, and a preset character, and the target region is a region that is in the target object and that is indicated by the target object.

It should be noted that the target object includes important information required by the user. For example, in a case that the target object includes a character, the important information may be the character information, or other information indicated by the character information.

Optionally, in this embodiment of this application, the character smaller than or equal to the preset font size is a character that is smaller than or equal to the preset font size and that is included in the first image of the target object that is captured by the first camera. For example, assume that the first image is a supermarket poster and the poster includes "Buy one and get one free" displayed in a font size of 42 pt and "The seller reserves the right of interpretation" displayed in a font size of 5 pt. In a case that the preset font size is the font size 5 pt, "The seller reserves the right of interpretation" is the target object.

Optionally, in this embodiment of this application, the preset character includes at least one of the following: a preset number, a preset punctuation mark, a preset keyword (the keyword is a non-numeric character), and the like. This may be specifically determined according to an actual operation requirement, and is not specifically limited in this embodiment of this application. As described in the foregoing example, the first image is a supermarket poster. The supermarket poster includes "Buy one and get one free" displayed in large font and "Phone number: 136XXXX1234" displayed in small font, and the preset character is a number. In this case, "Phone number: 136XXXX1234" displayed in small font is the target object.

Step 102: The electronic device receives a first input.

Optionally, in this embodiment of this application, the first input is used for triggering the electronic device to complete capturing and generate the target image based on a captured image and a target layout mode. Specifically, if the electronic device uses two cameras to capture images, the electronic device may photograph the target object by using the first camera to obtain a third image, and photograph the target object by using the second camera to obtain a fourth image. The third image corresponds to the first image, and the fourth image corresponds to the second image. Specifically, the third image is an image obtained by triggering, by the user, the electronic device to photograph the target object in a case that a photographing parameter of the first camera remains unchanged after the first image (namely, a preview image) is displayed. That is, the first image is a preview image of the third image, and the third image is an image captured after the first image is previewed. It should be noted that a relationship between the second image and the fourth image is similar to that between the first image and the second image. Details are not described herein again.

Optionally, in this embodiment of this application, the first input may be an input to a physical button of the electronic device, for example, a pressing input to a volume button. The first input may alternatively be a voice input to the electronic device. Content of the voice input is used for instructing the electronic device to control the first camera and the second camera for capturing. For example, an input voice is "capture". The first input may alternatively be a touch input to a screen of the electronic device, and the touch input is used for triggering the electronic device to control the first camera and the second camera for capturing. The touch input may be any one of the following: tapping, double-tapping, touching-and-holding, and the like. This may be specifically determined according to an actual operation requirement, and is not specifically limited in this embodiment of this application.

Step 103: The electronic device captures a third image and a fourth image in response to the first input, and generates a target image based on the third image and the fourth image according to a target layout mode.

The target layout mode is a layout mode of the first image and the second image.

Optionally, in this embodiment of this application, step 103 may be specifically implemented by the following step 103a and step 103b.

Step 103a: The electronic device captures the third image and the fourth image in response to the first input.

Optionally, in this embodiment of this application, the first image is a first preview image of the target object that is captured by the first camera, the second image is a second preview image of the target object that is captured by the second camera, and a zoom ratio of the second camera is higher than that of the first camera. Specifically, step 103a may be implemented by the following step 103a1.

Step 103a1: In response to the first input, the electronic device photographs the target object by using the first camera to obtain the third image, and photographs the target object by using the second camera to obtain the fourth image.

It should be noted that, in this embodiment of this application, for detailed descriptions of the photographing the target object by using the first camera to obtain the third image, photographing the target object by using the second camera to obtain the fourth image, and correspondences between the third image and the first image and between the fourth image and the second image, reference may be made to related descriptions in step 102. Details are not described herein again.

In addition, both the first camera and the second camera are cameras capable of photographing the target object, and the zoom ratio of the second camera is higher than that of the first camera. Specifically, the first camera and the second camera may be cameras that are disposed on a same side of the electronic device and that have a same orientation.

It should be noted that, in this embodiment of this application, because the zoom ratio of the second camera is higher than that of the first camera, a local image of the target object that is captured by the second camera is equivalent to a locally enlarged image of an entire image of the target object that is captured by the first camera, that is, the second image is equivalent to a locally enlarged image of the first image. In other words, the enlarging effect is achieved based on the zoom ratio of the second camera being higher than that of the first camera, rather than simple enlarged display of the first image.

It can be understood that, because the zoom ratio of the second camera is higher than that of the first camera, the fourth image captured by the second camera is equivalent to a locally enlarged image of the third image, so that the electronic device can synthesize the third image and the fourth image into the target image according to the layout mode of the first image and the second image. In this way, the electronic device can generate an original image (namely, the target image) including a locally enlarged image. This can prevent some important information in the original image from being ignored and perform a reminder function.

Step 103b: The electronic device generates the target image based on the third image and the fourth image according to the target layout mode.

Optionally, in this embodiment of this application, the target layout mode is the layout mode of the first image and the second image. Specifically, the layout mode includes the following layout elements: a display position, a stacking sequence, a stacking mode, an image size, and the like. This may be specifically determined according to an actual operation requirement, and is not specifically limited in this embodiment of this application.

Optionally, in this embodiment of this application, the generating the target image based on the third image and the fourth image may be implemented by the following steps:

Step a: The electronic device determines the target layout mode based on the first image and the second image displayed on the preview interface. The target layout mode is equivalent to a layout template determined based on the first image and the second image. A layout mode of the template is determined (that is, layout elements such as an image display position, a stacking sequence, a stacking mode, and an image size are determined). However, an image in the template (for example, the first image or the second image) can be replaced. For example, the first image is replaced with the third image, and the second image is replaced with the fourth image.

Step b: The electronic device generates the target image based on the third image, the fourth image, and the target layout mode. A manner of generating the target image may be any one of the following manners. Manner 1: The electronic device replaces the first image with the third image and replaces the second image with the fourth image according to the determined target layout mode, to generate the target image. Manner 2: The electronic device arranges the third image and the fourth image according to the target layout mode and displays them in a stacked manner, to generate the target image. This may be specifically determined according to an actual operation requirement, and is not specifically limited in this embodiment of this application.

It should be noted that the target image is an output image, and the target image includes content of the third image and the fourth image.

Figure 2:
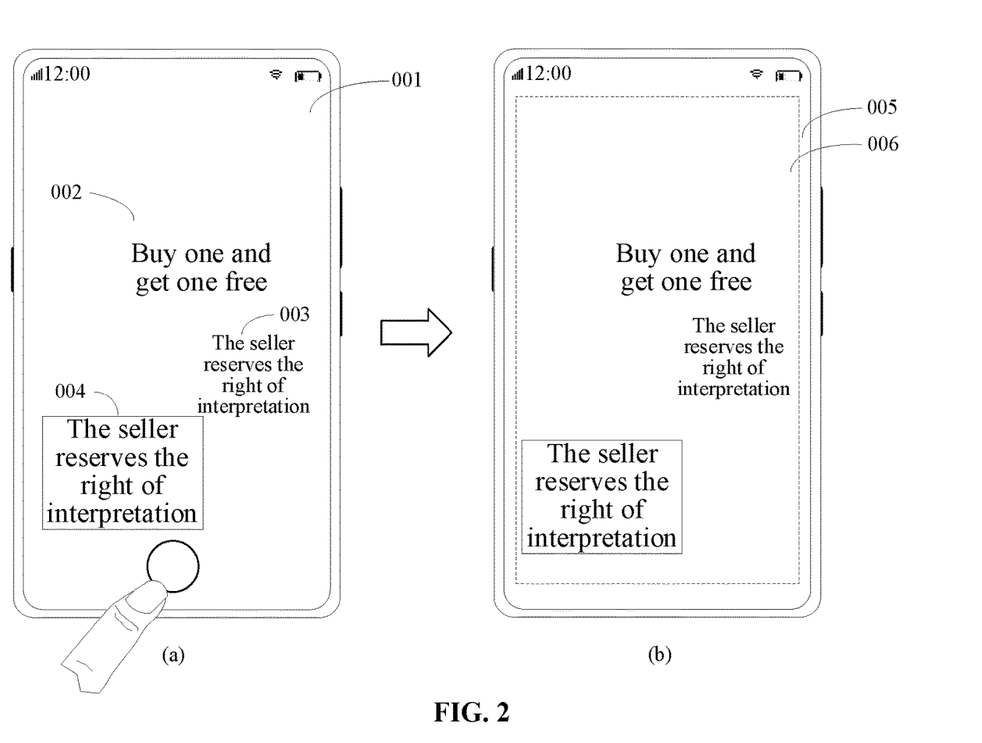
FIG. 2 is a first schematic diagram of an operation of generating a target image by an electronic device according to an embodiment of this application.

For example, FIG. 2 is a first schematic diagram of an operation of generating the target image by the electronic device. As shown in (a) in FIG. 2, the electronic device displays the first image and the second image on a photographing preview interface 001. "Buy one and get one free" is displayed in large font in a region 002 of the first image, and "The seller reserves the right of interpretation" (namely, the target object) is displayed in small font in a region 003 of the first image. "The seller reserves the right of interpretation" is displayed in large font in a region 004 of the second image (that is, the second image is displayed in the region 004). The first image is a poster image captured by the first camera of the electronic device, and the second image is a partial image of a poster image captured by the second camera (that is, an image in which "The seller reserves the right of interpretation" is displayed in small font). The zoom ratio of the second camera is higher than that of the first camera. The user may tap a capture control. As shown in (b) in FIG. 2, the electronic device captures the third image by using the first camera and captures the fourth image by using the second camera, and then synthesizes the third image and the fourth image into a target image 006 according to the layout mode of the first image and the second image. The electronic device displays the target image 006 on a display interface 005.

In the image generation method provided in this embodiment of this application, in a case that the first image is displayed in the first region of the photographing preview interface and the first image includes the target object, the second image including the target object is displayed in the second region in the first region, where the display size of the target object in the second image is greater than the display size of the target object in the first image. Then the electronic device receives the first input, captures the third image and the fourth image in response to the input, and generates the target image based on the third image and the fourth image according to the layout mode of the first image and the second image. According to the method, the electronic device may display, on the preview interface, an original image (for example, the first image) and a locally enlarged image (for example, the second image) that include important information, and may receive an input by a user for triggering the electronic device to capture the third image and the fourth image, and synthesize the third image and the fourth image into a target image according to a layout mode of the original image and the locally enlarged image. In this way, the electronic device can generate an original image (namely, the target image) including a locally enlarged image. This can prevent some important information in the original image from being ignored and perform a reminder function, so as to facilitate operations by the user and improve user experience.

Figure 3:
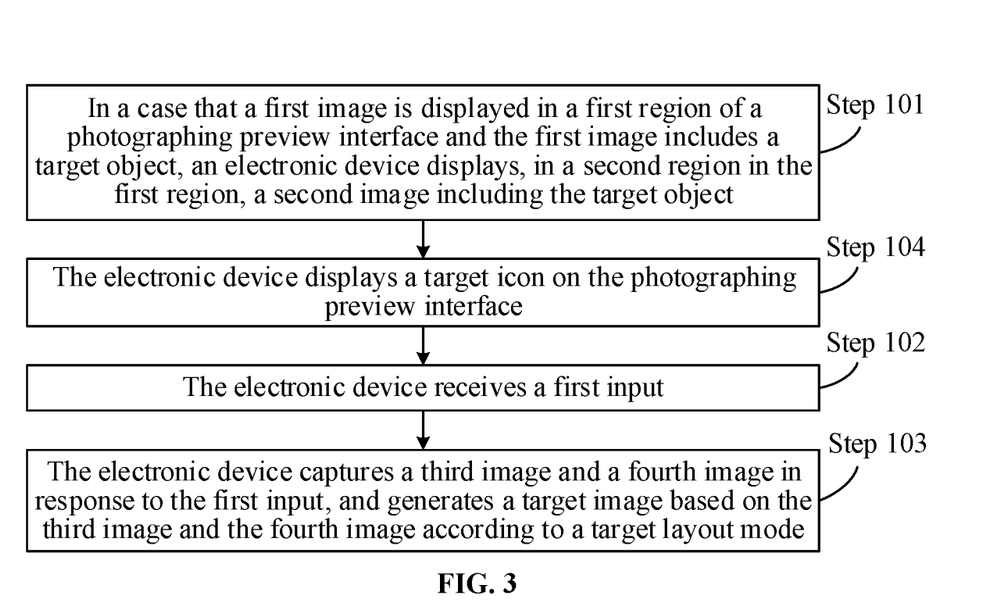
FIG. 3 is a second schematic diagram of an image generation method according to an embodiment of this application.

Optionally, with reference to FIG. 1, as shown in FIG. 3, before step 102, the image generation method provided in this embodiment of this application further includes the following step 104.

Step 104: The electronic device displays a target icon on the photographing preview interface.

The target icon is used for indicating a correspondence between the target object in the image in the first region and the target object in the image in the second region.

It should be noted that the target icon is used for indicating a correspondence between the target object in the first region and the target object in the second region, and specifically, a correspondence between the target object in the first image in the first region and the target object in the second image in the second region. Specifically, the correspondence is used for indicating that the target objects in the two images are the same object.

Optionally, in this embodiment of this application, the target icon may be displayed on the photographing preview interface before the first input is received, to indicate the correspondence between the target object in the first region (that is, the first image in the first region) and the target object in the second region (that is, the second image in the second region). The target icon may still be displayed in the generated target image. In this case, the target icon is used for indicating a correspondence between the third image at a position of the first region in the target image and the fourth image at a position of the second region in the target image.

It should be noted that, for ease of description of the following embodiments, the target icon displayed on the photographing preview interface is referred to as a first icon, and the target icon displayed in the target image is referred to as a second icon for detailed description. Correspondingly, step 104 may be specifically implemented by the following step 104a, and step 103b may be specifically implemented by the following step 103b1.

In addition, display forms of the first icon and the second icon may be the same or different. This is not specifically limited in this embodiment of this application.

Step 104a: The electronic device displays the first icon on the photographing preview interface.

The first icon is used for indicating that the second image is an enlarged image of a local region in the first image, and specifically, for indicating that the target object in the second image is an enlarged image of the target object in the first image.

Optionally, in this embodiment of this application, the first icon is used for indicating that the second image is an enlarged image of a local region in the first image. For example, in a case that the first icon is an arrow, one end of the arrow may indicate a position of local content in the first image (for example, a position of "The seller reserves the right of interpretation" displayed in small font in the first image in the poster in the foregoing example), and the other end of the arrow may indicate a position of the second image (that is, a position of "The seller reserves the right of interpretation" displayed in an enlarged manner in the second image). That is, the arrow icon is used for indicating that the second image is an enlarged image of a local region in the first image.

For another example, in a case that the first icon is a magnifying glass icon and a lens region of the magnifying glass is the second region in which the second image is displayed, the magnifying glass icon may be located at a position of local content in the first image (for example, a position of "The seller reserves the right of interpretation" displayed in small font in the first image in the poster in the foregoing example), and the magnifying glass icon indicates that the second image (that is, the second image displayed in an enlarged manner in the lens region of the magnifying glass) is an enlarged image of a local region in the first image.

It should be noted that a display shape and a display mode of the first icon are not limited in this embodiment of this application and may be determined according to an actual operation requirement.

Step 103b1: The electronic device generates the target image based on the third image, the fourth image, and the second icon according to the target layout mode.

The second icon is used for indicating that the fourth image is an enlarged image of a local region in the third image. A display position of the second icon in the target image corresponds to that of the first icon on the photographing preview interface.

It should be noted that a difference between the target image generated in step 103b1 and the target image generated in step 103b lies in that the target image in step 103b1 not only includes the third image and the fourth image, but also includes the second icon that performs an indication function. The display position of the second icon in the target image corresponds to that of the first icon on the photographing preview interface.

Optionally, in this embodiment of this application, a display form of the second icon may be the same or different from that of the first icon, and the display position of the second icon in the target image corresponds to that of the first icon on the photographing preview interface.

Optionally, in this embodiment of this application, a manner of generating the target image in step 103b1 may be any one of the following manners. Manner A: The electronic device replaces the first image with the third image, replaces the second image with the fourth image, and replaces the first icon with the second icon according to the determined target layout mode, to generate the target image including the third image, the fourth image, and the second icon. Manner B: The electronic device arranges the third image and the fourth image according to the target layout mode, displays them in a stacked manner, and displays, in a stacked manner, the second icon at a position corresponding to the first icon in an image obtained through stacking (the second icon is displayed at a top layer in a stacked manner), to generate the target image including the third image, the fourth image, and the second icon. This may be specifically determined according to an actual operation requirement, and is not specifically limited in this embodiment of this application.

Figure 4:
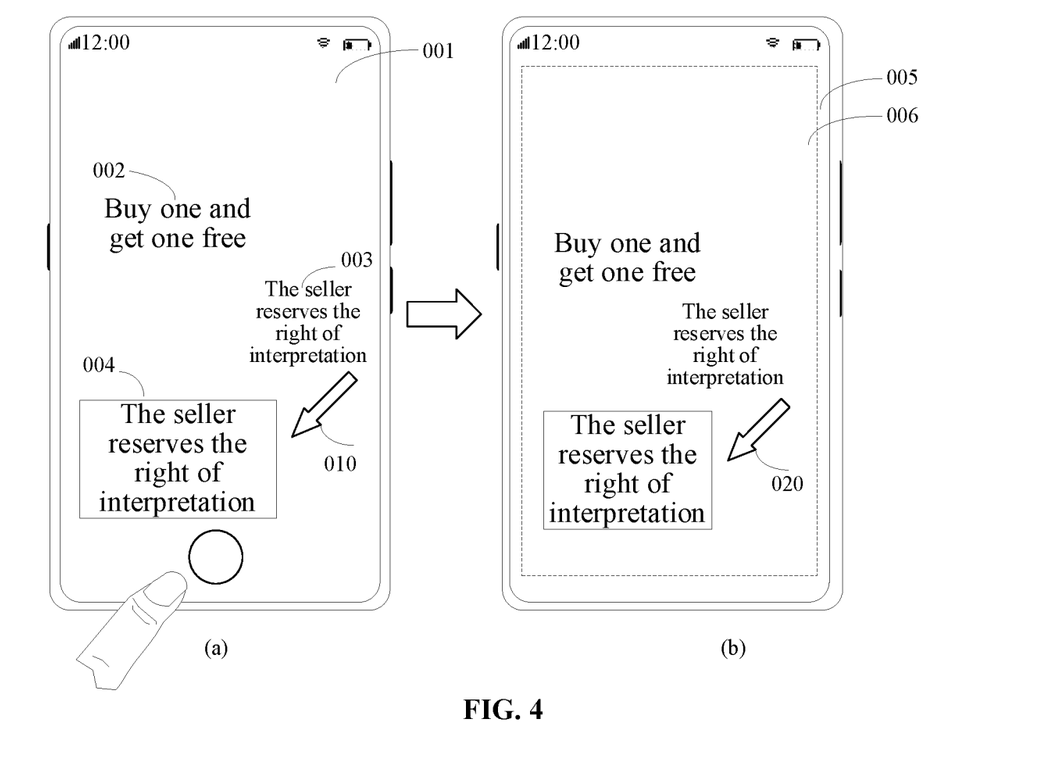
FIG. 4 is a second schematic diagram of an operation of generating a target image by an electronic device according to an embodiment of this application.

For example, FIG. 4 is a second schematic diagram of an operation of generating the target image by the electronic device. As shown in (a) in FIG. 4, the electronic device displays the first image and the second image on a photographing preview interface 001. "Buy one and get one free" is displayed in large font in a region 002 of the first image, and "The seller reserves the right of interpretation" is displayed in small font in a region 003 of the first image. "The seller reserves the right of interpretation" is displayed in large font in a region 004 of the second image (that is, the second image is displayed in the region 004). In addition, a first icon 010 is displayed on the photographing preview interface. One end of the first icon indicates "The seller reserves the right of interpretation" in small font in the region 003, and the other end of the first icon indicates the second image displayed in the region 004. The first image is a poster image captured by the first camera of the electronic device, and the second image is a partial image of a poster image captured by the second camera (that is, an image in which "The seller reserves the right of interpretation" is displayed in small font). The zoom ratio of the second camera is higher than that of the first camera. The user may tap a capture control. As shown in (b) in FIG. 4, the electronic device captures the third image by using the first camera and captures the fourth image by using the second camera, and then synthesizes the third image and the fourth image into a target image 006 according to the layout mode of the first image and the second image. A second icon 020 is displayed in the target image 006. A display position of the second icon 020 in the target image 006 corresponds to the display position of the first icon 010 on the photographing preview interface 001. The electronic device displays the target image 006 and the second icon 020 on a display interface 005.

It can be understood that the electronic device may display the target icon on the photographing preview interface to indicate the correspondence between the target object in the image in the first region and the target object in the image the second region. In addition, after the electronic device generates the target image, the target icon may still be displayed in the target image to indicate a correspondence between the third image at a position of the first region in the target image and the fourth image at a position of the second region in the target image. In this way, the user can quickly and accurately determine the correspondence between the fourth image and the third image, that is, quickly determine that the fourth image is an enlarged image of a specific part of the third image, so that the user can quickly obtain important information. This facilitates viewing and use by the user.

Optionally, in this embodiment of this application, a size of the second region is a preset size. The image generation method provided in this embodiment of this application further includes the following step 105 and step 106 (step 106 is "photographing the target object by using the second camera to obtain the second image" implied in step 101). Step 105 is performed before step 101, and correspondingly, step 106 may be implemented by the following step 106a.

Step 105: After the first image is captured by using the first camera and before the second image is captured by using the second camera, adjust a focal length of the second camera based on the size of the second region and the size of the target object in the first image.

Optionally, in this embodiment of this application, a manner of adjusting the focal length of the second camera based on the size of the second region and the size of the target object in the first image may be specifically implemented by the following step A1 to step A3.

Step A1: The electronic device obtains the size of the second region as a standard size, and obtains the size of the target object in the first image. A manner of the obtaining may be specifically: in a case that the second region is rectangular, obtaining a width and a height of the rectangular region; in a case that the second region is circular, obtaining a side length of an inscribed square of the circular region; and in a case that the second region is in another shape, obtaining a size (for example, a length and a width) of a largest rectangle enveloped by the another shape. The size of the target object in the first image is a size (for example, a length and a width) of a rectangle with a smallest area that can envelop the target object in the first image.

Step A2: The electronic device adjusts the focal length of the second camera, so that the size of the target object in the first image adapts to the standard size. Specifically, a focal length adjustment amount is calculated based on the size of the target object in the first image and the standard size (the focal length adjustment amount is a corresponding focal length variation of the second camera when the size of the target object in the first image is enlarged to adapt to the standard size), and the focal length of the second camera is adjusted based on the focal length adjustment amount, so that the display size of the target object can adapt to the size of the second region. That is, an adjusted focal length of the second camera can make the target object be displayed in the second region without going beyond the second region. This may be specifically determined according to an actual operation requirement, and is not specifically limited in this embodiment of this application.

Step 106a: The electronic device photographs the target object by using the second camera with the adjusted focal length to obtain the second image.

It should be noted that, in step 106a, the electronic device captures an image of a target region by using the second camera with the adjusted focal length and uses the image as the second image, where the target region in a region in which the target object is located. For a specific photographing operation, refer to detailed descriptions in step 103b and step 103b1. Details are not described herein again.

It may be understood that, after capturing the first image, the electronic device may adjust the focal length of the second camera based on the size of the second region and the size of the target object in the first image, so that the sizes adapt to each other, and capture an image of the target region by using the adjusted second camera to obtain the second image whose size adapts to the size of the second region. In this way, the second image including the target object can be displayed in the second region in a maximum allowed size, to achieve an effect that the second image is an enlarged image of a region that is in the first image and that includes the target object, so that the user can conveniently view important information displayed in the image in an enlarged manner.

Optionally, in the image generation method provided in this embodiment of this application, alternatively, the user may manually adjust the focal length of the second camera and trigger the second camera to obtain the second image.

Optionally, in this embodiment of this application, before step 102, the image generation method provided in this embodiment of this application further includes the following step 107 and step 108 below. Correspondingly, step 106 may be specifically implemented by the following step 106b.

Step 107: The electronic device displays the first image in the first region after capturing the first image by using the first camera.

It should be noted that, for detailed descriptions of displaying, by the electronic device, the first image in the first region after capturing the first image by using the first camera, reference may be made to related descriptions in step 101. Details are not described herein again.

Step 108: The electronic device receives a second input by the user for adjusting the focal length of the second camera.

Optionally, in this embodiment of this application, the second input is used for adjusting the focal length of the second camera. Specifically, the second input may be a touch input to an adjustment control displayed on the screen, where the adjustment control is used for adjusting the focal length of the second camera, and the touch input may be any one of the following: tapping, double-tapping, touching-and-holding, dragging according to a preset trajectory, and the like. The second input may alternatively be a voice input to the electronic device, and content of the voice input is used for instructing the electronic device to adjust the focal length of the second camera. This may be specifically determined according to an actual operation requirement, and is not specifically limited in this embodiment of this application.

It should be noted that a focal length of the second camera that is obtained through adjustment based on the second input can make the target object be displayed in the second region without going beyond the second region.

Step 106b: In response to the second input, the electronic device photographs the target object by using the adjusted second camera to obtain the second image.

It should be noted that, in step 106b, the electronic device captures an image of a target region by using the second camera with the adjusted focal length and uses the image as the second image. For a specific photographing operation, refer to detailed descriptions in step 106a. Details are not described herein again.

It may be understood that, in a case that the electronic device displays the first image in the first region after capturing the first image by using the first camera, the user may adjust the focal length of the second camera through the second input, and capture the second image based on the adjusted focal length. In this way, the user can manually perform adjustment according to an actual operation requirement, so that the target object in the second image can be displayed in the second region with a maximum allowed size, to facilitate viewing by the user.

Figure 5:
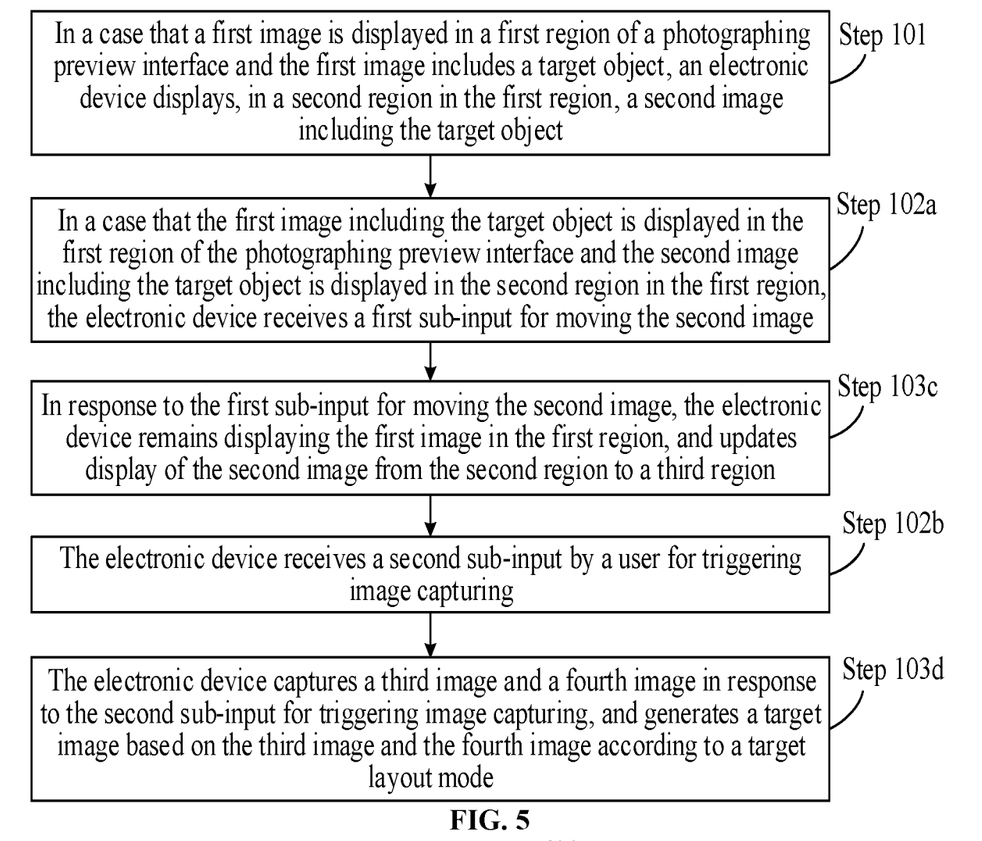
FIG. 5 is a third schematic diagram of an image generation method according to an embodiment of this application.

Optionally, with reference to FIG. 1, as shown in FIG. 5, the first input includes a first sub-input and a second sub-input. Step 102 may be specifically implemented by step 102a and step 102b. Correspondingly, step 103 may be specifically implemented by steps 103c and 103d.

Step 102a: In a case that the first image including the target object is displayed in the first region of the photographing preview interface and the second image including the target object is displayed in the second region in the first region, the electronic device receives the first sub-input for moving the second image.

Optionally, in this embodiment of this application, the first sub-input is used for changing a position of the second image on the photographing preview interface. For example, the second image is moved from the second region to a third region for display. Specifically, the first sub-input may be a touch input performed by the user on the second image, where the touch input may be any one of the following: tapping, double-tapping, dragging, and the like. For example, the first input may be an input that the user drags the second image from the second region to the third region, where both the second region and the third region are regions in the first region. This may be specifically determined according to an actual operation requirement, and is not specifically limited in this embodiment of this application.

Step 103*c*: In response to the first sub-input for moving the second image, the electronic device remains displaying the first image in the first region, and updates display of the second image from the second region to the third region.

The third region is a region in the first region.

It should be noted that, in this embodiment of this application, after the user changes a display position of the second image through the first sub-input, the first image in the first region remains displayed, and the second image is displayed at a position to which the second image is moved, that is, display of the second region is updated to the third region.

In addition, in this embodiment of this application, a display mode for updating display of the second image from the second region to the third region is not specifically limited in this application, and may be determined according to an actual operation requirement. For example, the display mode may be residual image display or moving track display.

Step 102*b*: The electronic device receives the second sub-input by the user for triggering image capturing.

Optionally, in this embodiment of this application, the second sub-input is used for triggering the electronic device to control the first camera and the second camera to capture images. Specifically, the second sub-input may be a pressing input to a physical button of the electronic device. The second sub-input may be a voice input to the electronic device, and the voice input is used for instructing the electronic device to control the first camera and the second camera to capture images. The second sub-input may alternatively be a touch input to the screen of the electronic device, and the touch input may be any one of the following: tapping, double-tapping, touching-and-holding, dragging according to a preset trajectory, and the like. This may be specifically determined according to an actual operation requirement, and is not specifically limited in this embodiment of this application.

Step 103*d*: The electronic device captures the third image and the fourth image in response to the second sub-input for triggering image capturing, and generates the target image based on the third image and the fourth image according to the target layout mode.

It should be noted that, in this embodiment of this application, step 103*d* is performed in response to triggering by the second sub-input. For descriptions of a specific execution process, refer to detailed descriptions in step 103 (specifically, refer to step 103*a* and step 103*b*). Details are not described herein again.

It can be understood that the user can achieve the effects of the first input through two sub-inputs. The user may trigger, through the first sub-input for moving the second image, the electronic device to update a display position of the second image; trigger, through the second sub-input for triggering capturing, the electronic device to capture the third image and the fourth image; and generate the target image based on the third image and the fourth image according to the target layout mode. In this way, the user can adjust the display position of the second image according to an actual operation requirement, so as to generate the target image based on an adjusted position. This facilitates operations by the user and improves user experience.

It should be noted that the image generation method provided in the embodiments of this application may be performed by an image generation apparatus, or by a control module that is in the image generation apparatus and that is configured to perform the image generation method. In the embodiments of this application, an apparatus provided in the embodiments of this application is described by using an example in which an image generation apparatus performs the image generation method.

Figure 6:
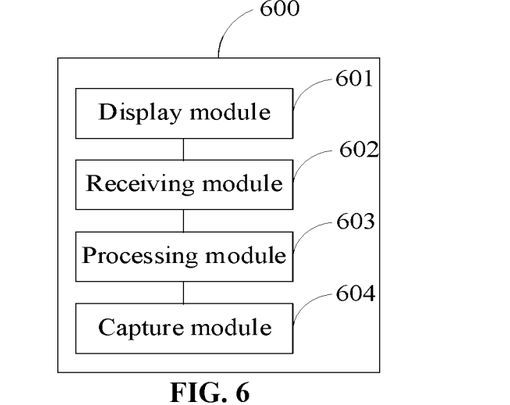
FIG. 6 is a schematic structural diagram of an image generation apparatus according to an embodiment of this application.

As shown in FIG. 6, an embodiment of this application provides an image generation apparatus 600. The image generation apparatus 600 may include a display module 601, a receiving module 602, a processing module 603, and a capture module 604. The display module 601 may be configured to: in a case that a first image is displayed in a first region of a photographing preview interface and the first image includes a target object, display, in a second region in the first region, a second image including the target object, where a display size of the target object in the second image is greater than a display size of the target object in the first image. The receiving module 602 may be configured to receive a first input. The processing module 603 may be configured to: in response to the first input received by the receiving module 602, control the capture module 604 to capture a third image and a fourth image, and generate a target image based on the third image and the fourth image according to a target layout mode, where the target layout mode is a layout mode of the first image and the second image.

Optionally, in this embodiment of this application, the first image is a first preview image of the target object that is captured by a first camera, the second image is a second preview image of the target object that is captured by a second camera, and a zoom ratio of the second camera is higher than that of the first camera. The capture module 604 may be specifically configured to: in response to the first input, photograph the target object by using the first camera to obtain the third image, and photograph the target object by using the second camera to obtain the fourth image.

Optionally, in this embodiment of this application, the display module 601 may be further configured to: before the first input is received, display a target icon on the photographing preview interface, where the target icon is used for indicating a correspondence between the target object in the first image and the target object in the second image.

Optionally, in this embodiment of this application, a size of the second region is a preset size, and the image generation apparatus 600 may further include an adjustment module 605. The adjustment module 605 may be configured to: after the first image is captured by using the first camera and before the second image is captured by using the second camera, adjust a focal length of the second camera based on the size of the second region and the size of the target object in the first image.

The capture module 604 may be specifically configured to photograph the target object by using the second camera with an adjusted focal length to obtain the second image.

Optionally, in this embodiment of this application, the display module 601 may be further configured to display the first image in the first region after the first image is captured by using the first camera. The receiving module 602 may be further configured to receive a second input by a user for adjusting a focal length of the second camera. The capture module 604 may be further configured to: in response to the second input received by the receiving module 602, photograph the target object by using the adjusted second camera to obtain the second image.

Optionally, in this embodiment of this application, the first input includes a first sub-input and a second sub-input. The display module 601 may be further configured to: in response to the first sub-input for moving the second image, remain displaying the first image in the first region, and update display of the second image from the second region to a third region, where the third region is a region in the first region. The processing module 603 may be further configured to: in response to the second sub-input for triggering image capturing, control the capture module 604 to capture the third image and the fourth image, and generate the target image based on the third image and the fourth image according to the target layout mode.

The image generation apparatus in this embodiment of this application may be a functional entity and/or a functional module for performing the image generation method in an electronic device, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an ultra-mobile personal computer (ultra-mobile personal computer, UMPC), a netbook, or a personal digital assistant (personal digital assistant, PDA), and the non-mobile electronic device may be a server, a network attached storage (network attached storage, NAS), a personal computer (personal computer, PC), a television (television, TV), a teller machine, or a self-service machine. This is not specifically limited in this embodiment of this application.

The image generation apparatus in this embodiment of this application may be an apparatus with an operating system. The operating system may be an Android (Android) operating system, may be an iOS operating system, or may be another possible operating system. This is not specifically limited in this embodiment of this application.

The image generation apparatus provided in this embodiment of this application is capable of implementing the processes implemented by the image generation apparatus in the method embodiments of FIG. 1 to FIG. 5. To avoid repetition, details are not described herein again.

In the image generation apparatus provided in this embodiment of this application, in a case that the first image is displayed in the first region of the photographing preview interface and the first image includes the target object, the second image including the target object is displayed in the second region in the first region, where the display size of the target object in the second image is greater than the display size of the target object in the first image. Then the image generation apparatus receives the first input, captures the third image and the fourth image in response to the input, and generates the target image based on the third image and the fourth image according to the layout mode of the first image and the second image. According to the method, the image generation apparatus may display, on the preview interface, an original image (for example, the first image) and a locally enlarged image (for example, the second image) that include important information, and may receive an input by a user for triggering the image generation apparatus to capture the third image and the fourth image, and synthesize the third image and the fourth image into a target image according to a layout mode of the original image and the locally enlarged image. In this way, the image generation apparatus can generate an original image (namely, the target image) including a locally enlarged image. This can prevent some important information in the original image from being ignored and perform a reminder function, so as to facilitate operations by the user and improve user experience.

Figure 7:
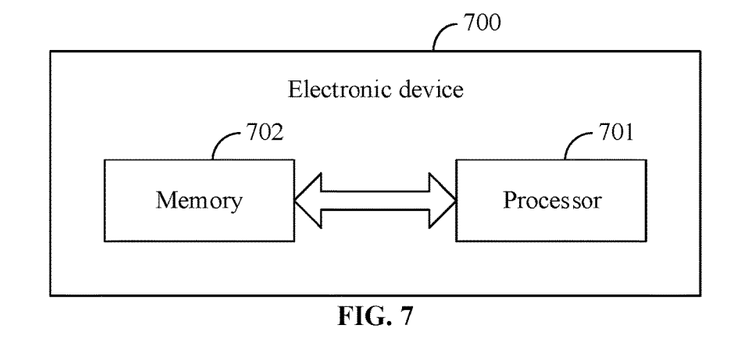
FIG. 7 is a first schematic diagram of hardware of an electronic device according to an embodiment of this application.

Optionally, as shown in FIG. 7, an embodiment of this application further provides an electronic device 700, including a processor 701, a memory 702, and a program or instructions stored in the memory 702 and capable of running on the processor 701. When the program or instructions are executed by the processor 701, the processes of the foregoing image generation method embodiments are implemented, with the same technical effects achieved. To avoid repetition, details are not described herein again.

It should be noted that the electronic device in this embodiment of this application includes the foregoing mobile electronic device and non-mobile electronic device.

Figure 8:
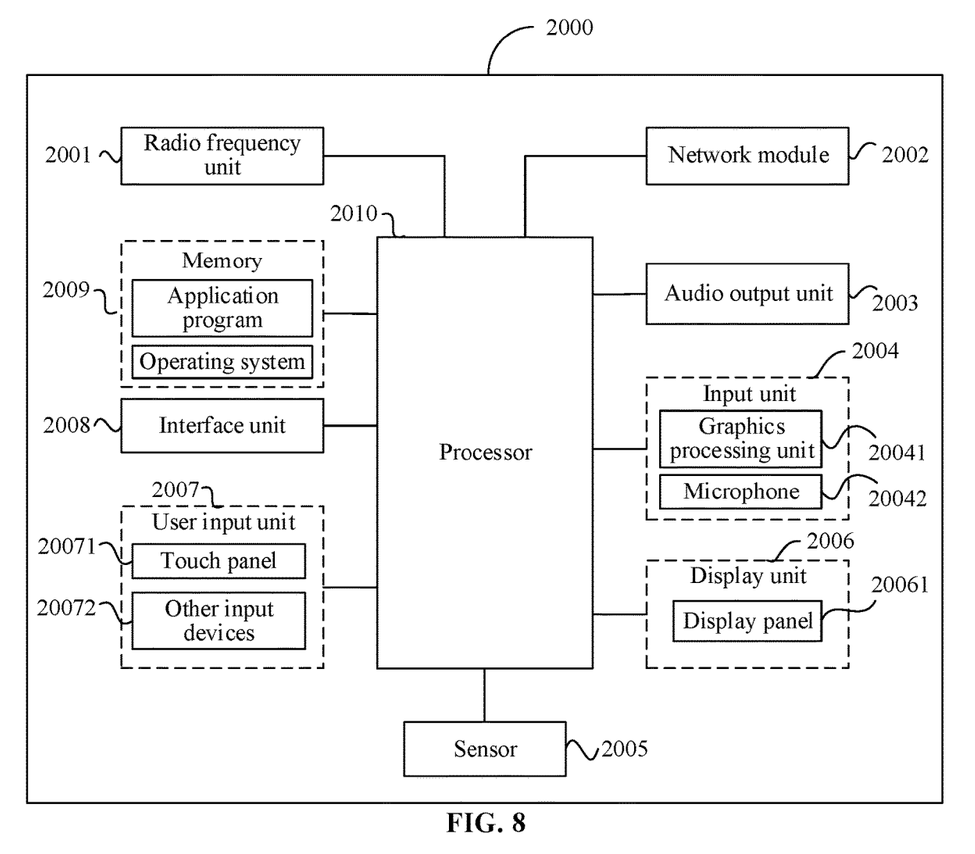
FIG. 8 is a second schematic diagram of hardware of an electronic device according to an embodiment of this application.

FIG. 8 is a schematic diagram of a hardware structure of an electronic device for implementing the embodiments of this application.

The electronic device 2000 includes but is not limited to components such as a radio frequency unit 2001, a network module 2002, an audio output unit 2003, an input unit 2004, a sensor 2005, a display unit 2006, a user input unit 2007, an interface unit 2008, a memory 2009, and a processor 2010.

The input unit 2004 may include a graphics processing unit 20041 and a microphone 20042. The display unit 2006 may include a display panel 20061. The user input unit 2007 may include a touch panel 20071 and other input devices 20072. The memory 2009 may be configured to store software programs (for example, an operating system, or an application program required by at least one function) and various data.

Persons skilled in the art can understand that the electronic device 2000 may further include a power supply (for example, a battery) that supplies power to each component. The power supply may be logically connected to the processor 2010 by using a power management system, to implement functions such as charging management, discharging management, and power consumption management by using the power management system. The structure of the electronic device shown in FIG. 8 does not constitute a limitation on the electronic device. The electronic device may include more or fewer components than those shown in the figure, or some components may be combined, or there may be a different component layout. Details are not described herein again.

The display unit 2006 may be configured to: in a case that a first image is displayed in a first region of a photographing preview interface and the first image includes a target object, display, in a second region in the first region, a second image including the target object, where a display size of the target object in the second image is greater than a display size of the target object in the first image. The user input unit 2007 may be configured to receive a first input. The processor 2010 may be configured to: in response to the first input received by the user input unit 2007, control capturing of a third image and a fourth image, and generate a target image based on the third image and the fourth image according to a target layout mode, where the target layout mode is a layout mode of the first image and the second image.

In the electronic device provided in this embodiment of this application, in a case that the first image is displayed in the first region of the photographing preview interface and the first image includes the target object, the second image including the target object is displayed in the second region in the first region, where the display size of the target object in the second image is greater than the display size of the target object in the first image. Then the electronic device receives the first input, captures the third image and the fourth image in response to the input, and generates the target image based on the third image and the fourth image according to the layout mode of the first image and the second image. According to the method, the electronic device may display, on the preview interface, an original image (for example, the first image) and a locally enlarged image (for example, the second image) that include important information, and may receive an input by a user for triggering the electronic device to capture the third image and the fourth image, and synthesize the third image and the fourth image into a target image according to a layout mode of the original image and the locally enlarged image. In this way, the electronic device can generate an original image (namely, the target image) including a locally enlarged image. This can prevent some important information in the original image from being ignored and perform a reminder function, so as to facilitate operations by the user and improve user experience.

Optionally, in this embodiment of this application, the first image is a first preview image of the target object that is captured by a first camera, the second image is a second preview image of the target object that is captured by a second camera, and a zoom ratio of the second camera is higher than that of the first camera. The processor 2010 may be specifically configured to: in response to the first input, photograph the target object by using the first camera to obtain the third image, and photograph the target object by using the second camera to obtain the fourth image.

It may be understood that, because the zoom ratio of the second camera is higher than that of the first camera, the fourth image captured by the second camera is equivalent to a locally enlarged image of the third image, so that the electronic device can synthesize the third image and the fourth image into the target image according to the layout mode of the first image and the second image. In this way, the electronic device can generate an original image (namely, the target image) including a locally enlarged image. This can prevent some important information in the original image from being ignored and perform a reminder function.

Optionally, in this embodiment of this application, the display unit 2006 may be further configured to: before the first input is received, display a target icon on the photographing preview interface, where the target icon is used for indicating a correspondence between the target object in the first image and the target object in the second image.

It can be understood that the electronic device may display the target icon on the photographing preview interface to indicate the correspondence between the target object in the image in the first region and the target object in the image the second region. In addition, after the electronic device generates the target image, the target icon may still be displayed in the target image to indicate a correspondence between the third image at a position of the first region in the target image and the fourth image at a position of the second region in the target image. In this way, the user can quickly and accurately determine the correspondence between the fourth image and the third image, that is, quickly determine that the fourth image is an enlarged image of a specific part of the third image, so that the user can quickly obtain important information. This facilitates viewing and use by the user.

Optionally, in this embodiment of this application, a size of the second region is a preset size, and the electronic device 2000 may further include an adjustment module 605. The adjustment module 605 may be configured to: after the first image is captured by using the first camera and before the second image is captured by using the second camera, adjust a focal length of the second camera based on the size of the second region and the size of the target object in the first image. The processor 2010 may be specifically config-ured to photograph the target object by using the second camera with an adjusted focal length to obtain the second image.

It may be understood that, after capturing the first image, the electronic device may adjust the focal length of the second camera based on the size of the second region and the size of the target object in the first image, so that the sizes adapt to each other, and capture an image of the target region by using the adjusted second camera to obtain the second image whose size adapts to the size of the second region. In this way, the second image including the target object can be displayed in the second region in a maximum allowed size, to achieve an effect that the second image is an enlarged image of a region that is in the first image and that includes the target object, so that the user can conveniently view important information displayed in the image in an enlarged manner.

Optionally, in this embodiment of this application, the display unit 2006 may be further configured to display the first image in the first region after the first image is captured by using the first camera. The user input unit 2007 may be further configured to receive a second input by a user for adjusting a focal length of the second camera. The processor 2010 may be further configured to: in response to the second input received by the user input unit 2007, photograph the target object by using the adjusted second camera to obtain the second image.

It may be understood that, in a case that the electronic device displays the first image in the first region after capturing the first image by using the first camera, the user may adjust the focal length of the second camera through the second input, and capture the second image based on the adjusted focal length. In this way, the user can manually perform adjustment according to an actual operation requirement, so that the target object in the second image can be displayed in the second region with a maximum allowed size, to facilitate viewing by the user.

Optionally, in this embodiment of this application, the first input includes a first sub-input and a second sub-input. The display unit 2006 may be further configured to: in response to the first sub-input for moving the second image, remain displaying the first image in the first region, and update display of the second image from the second region to a third region, where the third region is a region in the first region. The processor 2010 may be further configured to: in response to the second sub-input for triggering image capturing, control the processor 2010 to capture the third image and the fourth image, and generate the target image based on the third image and the fourth image according to the target layout mode.

It can be understood that the user can achieve the effects of the first input through two sub-inputs. The user may trigger, through the first sub-input for moving the second image, the electronic device to update a display position of the second image; trigger, through the second sub-input for triggering capturing, the electronic device to capture the third image and the fourth image; and generate the target image based on the third image and the fourth image according to the target layout mode. In this way, the user can adjust the display position of the second image according to an actual operation requirement, so as to generate the target image based on an adjusted position. This facilitates operations by the user and improves user experience.

An embodiment of this application further provides a readable storage medium. The readable storage medium stores a program or instructions. When the program or instructions are executed by a processor, the processes of the foregoing image generation method embodiments are implemented, with the same technical effects achieved. To avoid repetition, details are not described herein again.

The processor is a processor in the electronic device in the foregoing embodiments. The readable storage medium includes a computer-readable storage medium, for example, a computer read-only memory (Read-Only Memory, ROM), a random access memory (Random Access Memory, RAM), a magnetic disk, or an optical disc.

An embodiment of this application further provides a chip. The chip includes a processor and a communications interface. The communications interface is coupled to the processor. The processor is configured to run a program or instructions, to implement the processes of the foregoing image generation method embodiments, with the same technical effects achieved. To avoid repetition, details are not described herein again.

It should be understood that the chip provided in this embodiment of this application may also be referred to as a system-level chip, a system on chip, a chip system, a system-on-a-chip, or the like.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of this application essentially or the part contributing to the related art may be implemented in a form of a software product. The computer software product may be stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An image generation method, wherein the method comprises:
    in a case that a first image is displayed in a first region of a photographing preview interface and the first image comprises a target object, displaying, in a second region in the first region, a second image comprising the target object, wherein a display size of the target object in the second image is greater than a display size of the target object in the first image;
    receiving a first input; and
    capturing a third image and a fourth image in response to the first input, and generating a target image based on the third image and the fourth image according to a target layout mode, wherein
    the target layout mode is a layout mode of the first image and the second image; the target object is at least one of the following: a character smaller than or equal to a preset font size, and a preset character.

2. The method according to claim 1, wherein the first image is a first preview image of the target object that is captured by a first camera, the second image is a second preview image of the target object that is captured by a second camera, and a zoom ratio of the second camera is higher than that of the first camera; and
    the capturing a third image and a fourth image in response to the first input comprises:
    in response to the first input, photographing the target object by using the first camera to obtain the third image, and photographing the target object by using the second camera to obtain the fourth image.

3. The method according to claim 1, wherein before the receiving a first input, the method further comprises:
    displaying a target icon on the photographing preview interface, wherein the target icon is used for indicating a correspondence between the target object in the image in the first region and the target object in the image in the second region.

4. The method according to claim 2, wherein a size of the second region is a preset size, and the method further comprises:
    after the first image is captured by using the first camera and before the second image is captured by using the second camera, adjusting a focal length of the second camera based on the size of the second region and the size of the target object in the first image; and
    photographing the target object by using the second camera with an adjusted focal length to obtain the second image.

5. The method according to claim 2, wherein the method further comprises:
    displaying the first image in the first region after the first image is captured by using the first camera;
    receiving a second input by a user for adjusting a focal length of the second camera; and
    in response to the second input, photographing the target object by using the adjusted second camera to obtain the second image.

6. The method according to claim 1, wherein the first input comprises a first sub-input and a second sub-input; and
    the capturing a third image and a fourth image in response to the first input, and generating a target image based on the third image and the fourth image according to a target layout mode comprises:

in response to the first sub-input for moving the second image, remaining displaying the first image in the first region, and updating display of the second image from the second region to a third region, wherein the third region is a region in the first region; and in response to the second sub-input for triggering image capturing, capturing the third image and the fourth image, and generating the target image based on the third image and the fourth image according to the target layout mode.

7. An electronic device, comprising a processor, a memory, and a program or instructions stored in the memory and executable on the processor, wherein the program or instructions are executed by the processor to perform:

in a case that a first image is displayed in a first region of a photographing preview interface and the first image comprises a target object, displaying, in a second region in the first region, a second image comprising the target object, wherein a display size of the target object in the second image is greater than a display size of the target object in the first image;

receiving a first input; and capturing a third image and a fourth image in response to the first input, and generating a target image based on the third image and the fourth image according to a target layout mode, wherein the target layout mode is a layout mode of the first image and the second image; the target object is at least one of the following: a character smaller than or equal to a preset font size, and a preset character.

8. The electronic device according to claim 7, wherein the first image is a first preview image of the target object that is captured by a first camera, the second image is a second preview image of the target object that is captured by a second camera, and a zoom ratio of the second camera is higher than that of the first camera; and the capturing a third image and a fourth image in response to the first input comprises:

in response to the first input, photographing the target object by using the first camera to obtain the third image, and photographing the target object by using the second camera to obtain the fourth image.

9. The electronic device according to claim 8, wherein a size of the second region is a preset size, and the processor is further configured to perform:

after the first image is captured by using the first camera and before the second image is captured by using the second camera, adjusting a focal length of the second camera based on the size of the second region and the size of the target object in the first image; and photographing the target object by using the second camera with an adjusted focal length to obtain the second image.

10. The electronic device according to claim 8, wherein the processor is further configured to perform:

displaying the first image in the first region after the first image is captured by using the first camera;

receiving a second input by a user for adjusting a focal length of the second camera; and in response to the second input, photographing the target object by using the adjusted second camera to obtain the second image.

11. The electronic device according to claim 7, wherein before the receiving a first input, the processor is further configured to perform:

displaying a target icon on the photographing preview interface, wherein the target icon is used for indicating a correspondence between the target object in the image in the first region and the target object in the image in the second region.

12. The electronic device according to claim 7, wherein the first input comprises a first sub-input and a second sub-input; and the capturing a third image and a fourth image in response to the first input, and generating a target image based on the third image and the fourth image according to a target layout mode comprises:

in response to the first sub-input for moving the second image, remaining displaying the first image in the first region, and updating display of the second image from the second region to a third region, wherein the third region is a region in the first region; and in response to the second sub-input for triggering image capturing, capturing the third image and the fourth image, and generating the target image based on the third image and the fourth image according to the target layout mode.

13. A non-transitory readable storage medium for performing the method according to claim 1, wherein the readable storage medium stores a program or instructions, the program or instructions are executed by a processor to perform:

in a case that a first image is displayed in a first region of a photographing preview interface and the first image comprises a target object, displaying, in a second region in the first region, a second image comprising the target object, wherein a display size of the target object in the second image is greater than a display size of the target object in the first image;

receiving a first input; and capturing a third image and a fourth image in response to the first input, and generating a target image based on the third image and the fourth image according to a target layout mode, wherein the target layout mode is a layout mode of the first image and the second image; the target object is at least one of the following: a character smaller than or equal to a preset font size, and a preset character.

14. A non-transitory computer software product for performing the method according to claim 1, wherein the computer software product is executed by at least one processor to perform:

in a case that a first image is displayed in a first region of a photographing preview interface and the first image comprises a target object, displaying, in a second region in the first region, a second image comprising the target object, wherein a display size of the target object in the second image is greater than a display size of the target object in the first image;

receiving a first input; and capturing a third image and a fourth image in response to the first input, and generating a target image based on the third image and the fourth image according to a target layout mode, wherein the target layout mode is a layout mode of the first image and the second image; the target object is at least one of the following: a character smaller than or equal to a preset font size, and a preset character.

15. An electronic device, wherein the electronic device is configured to perform:

in a case that a first image is displayed in a first region of a photographing preview interface and the first image comprises a target object, displaying, in a second region in the first region, a second image comprising the target object, wherein a display size of the target object in the second image is greater than a display size of the target object in the first image;

receiving a first input; and capturing a third image and a fourth image in response to the first input, and generating a target image based on the third image and the fourth image according to a target layout mode, wherein the target layout mode is a layout mode of the first image and the second image; the target object is at least one of the following: a character smaller than or equal to a preset font size, and a preset character.

16. The electronic device according to claim 15, wherein the first image is a first preview image of the target object that is captured by a first camera, the second image is a second preview image of the target object that is captured by a second camera, and a zoom ratio of the second camera is higher than that of the first camera; and the capturing a third image and a fourth image in response to the first input comprises:

in response to the first input, photographing the target object by using the first camera to obtain the third image, and photographing the target object by using the second camera to obtain the fourth image.

17. The electronic device according to claim 16, wherein a size of the second region is a preset size, and the processor is further configured to perform:

after the first image is captured by using the first camera and before the second image is captured by using the second camera, adjusting a focal length of the second camera based on the size of the second region and the size of the target object in the first image; and photographing the target object by using the second camera with an adjusted focal length to obtain the second image.

18. The electronic device according to claim 16, wherein the processor is further configured to perform:

displaying the first image in the first region after the first image is captured by using the first camera;

receiving a second input by a user for adjusting a focal length of the second camera; and in response to the second input, photographing the target object by using the adjusted second camera to obtain the second image.

19. The electronic device according to claim 15, wherein before the receiving a first input, the processor is further configured to perform:

displaying a target icon on the photographing preview interface, wherein the target icon is used for indicating a correspondence between the target object in the image in the first region and the target object in the image in the second region.

20. The electronic device according to claim 15, wherein the first input comprises a first sub-input and a second sub-input; and the capturing a third image and a fourth image in response to the first input, and generating a target image based on the third image and the fourth image according to a target layout mode comprises:

in response to the first sub-input for moving the second image, remaining displaying the first image in the first region, and updating display of the second image from the second region to a third region, wherein the third region is a region in the first region; and in response to the second sub-input for triggering image capturing, capturing the third image and the fourth image, and generating the target image based on the third image and the fourth image according to the target layout mode.

* * * * *